S. WOHLDT, OF DERRY, PENNSYLVANIA.

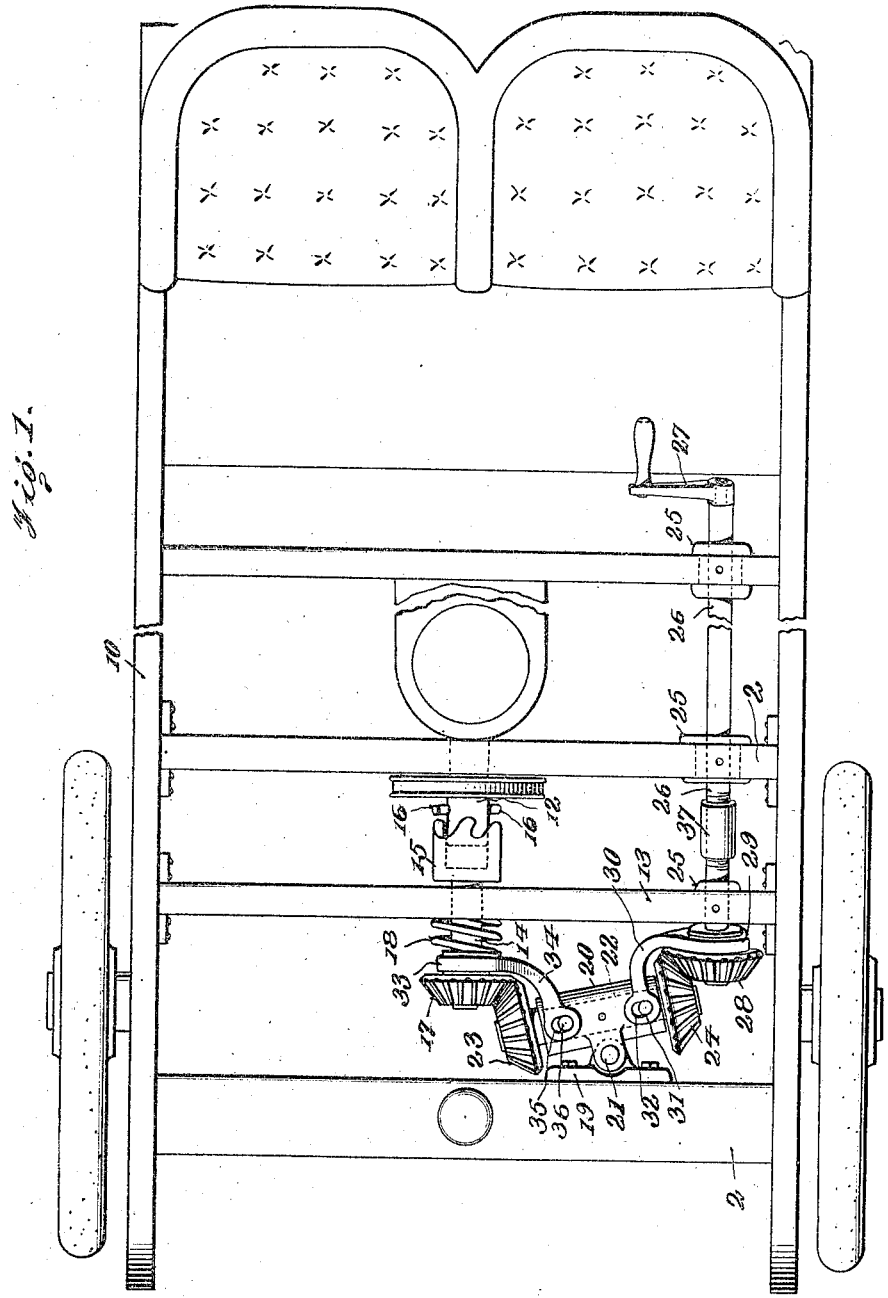

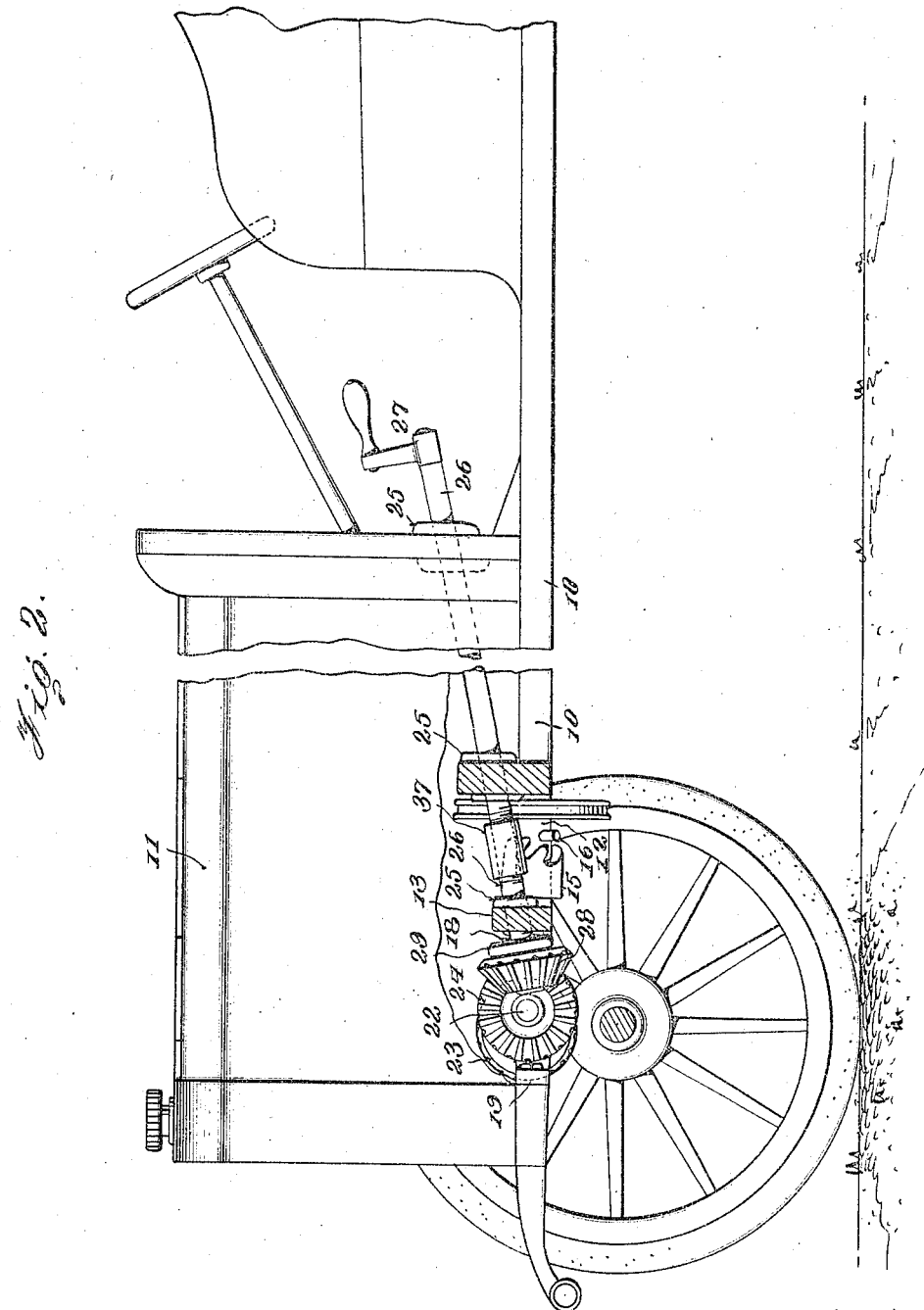

AUTOMOBILE CRANKING DEVICE.

987,528.

Specification of Letters Patent.    Patented Mar. 21, 1911.

Application filed September 14, 1910. Serial No. 582,090.

*To all whom it may concern:*

Be it known that I, SIGFRID WOHLDT, citizen of the United States, residing at Derry, in the county of Westmoreland and State of Pennsylvania, have invented certain new and useful Improvements in Automobile Cranking Devices, of which the following is a specification.

This invention relates to automobiles, and has for its object to provide a simply constructed apparatus whereby the "cranking" may be accomplished from the driver's seat, and without the necessity for dismounting.

Another object of the invention is to provide a device of this character which is automatically connected to and disconnected from the "cranking" shaft by the same movements which operate the same.

With these and other objects in view the invention consists in certain novel features of construction as hereafter shown and described and then specifically pointed out in the claims.

The improved device may be applied without material structural changes to automobiles of various makes and forms, but for the purpose of illustration is shown applied to a conventional vehicle of this class, and in the drawings thus employed, Figure 1 is a plan view, partly in section, of a portion of an automobile, with the improvement applied. Fig. 2 is a section on the line 2—2 of Fig. 1.

Corresponding and like parts are referred to in the following description and indicated in all the views of the drawings by the same reference characters.

In the drawings the frame work of the automobile is represented at 10, the motor casing at 11, and a portion of the "cranking" shaft at 12, of the usual construction.

The improved device comprises in general a clutch between the operating mechanism and the sparker or "cranking" shaft, a crank rod arranged for both rotary and longitudinal movement and leading to a point convenient to the driver's seat, and connecting mechanism between the crank rod and the clutch whereby the clutch is closed and the sparker shaft operated by the same operating rod.

The improved device comprises more specifically a transverse supporting member 13 carried by the frame 10 and through which a clutch shaft 14 is mounted for both slidable and rotary motion. The shaft 14 is provided at one end with a tubular clutch member 15 which slides over the end of the engine shaft 12 and engages when in one position, with pins 16 projecting from the latter and is disengaged from the pins when in its other position. At its opposite end the shaft 14 is provided with a bevel gear 17 and with a spring 18 between the bevel gear and the member 13, the spring thus operating to maintain the clutch member 15 yieldably out of engagement.

Connected to the forward member of the frame 10 is a bracket 19 having a bearing sleeve 20 mounted to swing thereon at 21. The bearing sleeve carries a counter shaft 22 having a bevel gear 23 on one end in constant engagement with the gear 17, and with another bevel gear 24 upon its other end. Extending longitudinally of the frame 10 and supported therefrom by suitable bearings 25, is an operating rod 26, the rod being arranged for both rotary and longitudinal movement in its bearings. The rod 26 is provided with an operating crank 27 at one end and a bevel gear 28 at the other end, the latter being in constant engagement with the bevel gear 24.

The hub of the gear wheel 28 is provided with an annular channel, and engaging in this channel is a collar 29, the hub thus rotating in the collar, and projecting from the collar is an arm 30 which is extended over the sleeve 20 and coupled movably thereto as by a slot 31 and pin 32, to provide a flexible joint between the rod and the sleeve. The hub of the gear 17 is also provided with an annular channel to receive a collar 33 having an arm 34 extending over the bearing sleeve 20 and flexibly coupled thereto by a slot 35 and pin 36, to provide a flexible joint between the shafts 14 and 20 and the bearing sleeve.

By this arrangement the parts are firmly supported during all parts of the movements and cramping or unequal movements between the gears prevented.

The rod 26 is preferably formed in two parts connected by an adjustable coupling sleeve 37, so that the rod may be adjusted longitudinally, as required. The crank 27 is preferably detachable from the rod when not in use.

The force of the spring 18 is sufficient to maintain the clutch member 15 normally disconnected from the engine shaft 12 and also to maintain the rod 26 yieldably at one end of its movement longitudinally, as shown in Fig. 1. Then when the driver desires to "crank" the engine to cause the sparker to operate he applies the crank 27 to the rod 26 and moves the latter endwise to rock the sleeve 20 upon its pivot 21 and couple the clutch and then as the crank is rotated the "sparker" is actuated in the usual manner, and this operation, it will be obvious, can be accomplished by the driver without leaving his seat.

The improved device is simple in construction, and can be readily applied without material structural changes to all the different makes of automobiles, and materially decreases the delay and annoyance of "cranking" vehicles of this class, as all the necessary movements can be produced by the driver without dismounting or leaving his seat.

Having thus described the invention, what is claimed as new is:

1. An attachment for automobiles comprising a clutch device adapted to be engaged with the engine shaft of an automobile, a bracket adapted to be connected to the frame of an automobile, a bearing sleeve mounted to swing upon said bracket, a shaft carried by said sleeve, motion transmitting means between said clutch device and the shaft of said sleeve and in constant engagement with said shaft, a member adapted to be operated from the seat of an automobile, means for rotatively coupling said operated member to said sleeve shaft, and means for maintaining said coupling member in constant engagement with the sleeve shaft.

2. The combination with an automobile including the frame and engine shaft, of a clutch member carried by said shaft, an opposing clutch member arranged to be engaged with said engine shaft clutch member, a shaft supported to swing intermediate its ends, an operating member movably connected to said frame, means for transmitting motion from said operating member to said swinging shaft, means for transmitting motion from said swinging shaft to said opposing clutch member, coupling means between said swinging shaft and said opposing clutch member, and coupling means between said operating member and said swinging shaft.

3. An attachment for automobiles comprising a clutch device adapted to be engaged with the engine shaft of an automobile, a bracket adapted to be connected to the frame of an automobile, a bearing sleeve mounted to swing upon said bracket, a shaft carried by said sleeve, an operating member operative from the seat of an automobile, means for transmitting motion from said member to said shaft, means for transmitting motion from said shaft to said clutch device, coupling means between said sleeve and said clutch device, and coupling means between said sleeve and said operating means.

In testimony whereof, I affix my signature in presence of two witnesses.

SIGFRID WOHLDT. [L. S.]

Witnesses:
G. E. SMITH,
ADAM L. DOBERNECK.

---

Copies of this patent may be obtained for five cents each, by addressing the "Commissioner of Patents, Washington, D. C."